United States Patent [19]
Shields et al.

[11] Patent Number: 4,781,437
[45] Date of Patent: Nov. 1, 1988

[54] DISPLAY LINE DRIVER WITH AUTOMATIC UNIFORMITY COMPENSATION

[75] Inventors: Steven E. Shields, San Diego; James E. Cooper, Jr., San Marcos, both of Calif.

[73] Assignee: Hughes Aircraft Company, Los Angeles, Calif.

[21] Appl. No.: 136,239

[22] Filed: Dec. 21, 1987

[51] Int. Cl.$^4$ .......................... C02F 1/13; G09G 3/18; G09G 3/36; H03K 5/159
[52] U.S. Cl. ..................... 350/332; 350/333; 307/353; 328/151; 340/765; 340/784
[58] Field of Search ............... 350/332, 333; 328/151; 307/352, 353; 340/765, 785, 805, 812

[56] References Cited

U.S. PATENT DOCUMENTS

| | | | |
|---|---|---|---|
| 3,392,345 | 7/1968 | Young | 328/151 |
| 3,516,002 | 6/1970 | Hillis | 328/151 |
| 3,541,320 | 11/1970 | Beall | 328/151 |
| 3,862,360 | 1/1975 | Dill et al. | 178/7.3 D |
| 4,100,579 | 7/1978 | Irnstoff | 350/333 |
| 4,149,151 | 4/1979 | Nagae et al. | 340/765 |
| 4,205,311 | 5/1980 | Kutaragi | 350/332 |
| 4,219,809 | 8/1980 | Schwarzschild et al. | 340/785 |
| 4,335,936 | 6/1982 | Nonomura et al. | 350/335 |
| 4,359,729 | 11/1982 | Nonomura et al. | 340/765 |
| 4,393,405 | 7/1983 | Ikeda | 358/153 |
| 4,455,576 | 6/1984 | Hoshi | 358/230 |
| 4,492,979 | 1/1985 | Ikeda | 358/153 |
| 4,496,977 | 1/1985 | Ikeda | 358/148 |
| 4,511,926 | 4/1985 | Crossland et al. | 350/332 |
| 4,591,848 | 5/1986 | Morozumi et al. | 340/784 |
| 4,649,383 | 3/1987 | Takeda et al. | 340/805 |
| 4,726,658 | 2/1988 | Nishimura et al. | 350/322 |

*Primary Examiner*—Stanley D. Miller
*Assistant Examiner*—Thuy K. Mai
*Attorney, Agent, or Firm*—Joseph E. Szabo; Anthony W. Karambelas

[57] ABSTRACT

An on-substrate driver circuit for a display line of a liquid crystal display having an amplifier connected in conjunction with an amplifier input capacitor, a sample/hold capacitor and three switches. The circuit operates in a first compensation mode wherein the first and second of the switches connect both a null reference voltage and the amplifier output voltage to the amplifier input capacitor, effectively nulling out or compensating for offset between the turn-on threshold, and hence the output, of a plurality of amplifiers on the display. After compensation, the circuit is switched to an operational mode wherein the first and second switches are open and a third switch connects the analog display signal to the sample/hold capacitor. A second preferred embodiment employing a double buffer including two consecutive, serially connected amplifier stages as described is also disclosed. In practice, a plurality of such double buffer circuits are arranged along the edge of a liquid crystal display panel and supplied with a common input signal by a single off-substrate input signal line.

17 Claims, 6 Drawing Sheets

DISPLAY LINE DRIVER WITH AUTOMATIC UNIFORMITY COMPENSATION

BACKGROUND OF THE INVENTION

1. Field of the Invention

The subject invention relates to liquid crystal displays and more particularly to driver circuitry fabricated on the same substrate as a liquid crystal display and employing selective feedback to compensate the video output signal of the driver circuitry to accommodate for variations in device threshold of the driver circuitry devices.

2. Description of Related Art

Liquid crystal matrix displays are known in general, for example, as disclosed in U.S. Pat. No. 3,862,360, assigned to Hughes Aircraft Company. In such displays, an analog signal, such as a video signal, is used to control the gray level of each display cell or "pixel." This analog or video signal is applied on a plurality of column supply buses or "display lines" and is selectively gated at the appropriate time to each display cell of the display by gate signals applied to a plurality of row or gate supply buses. Such displays typically employ one line driver per display line, sometimes referred to as "direct drive." The line drivers are typically not located on the substrate carrying the display cells, but rather are arrayed linearly adjacent one edge of the display substrate along a distance of several inches. As shown in the '360 patent, such line drivers may constitute the outputs of a dual serial to parallel video converter positioned adjacent the display substrate in order to properly interface a standard raster format video signal to the liquid crystal display.

Use of one off-substrate driver to drive several lines of a display, i.e. multiplexing of line driver inputs by a small factor, has also been attempted in the prior art. The number of line driver inputs which can be multiplexed using conventional on-display circuitry is restricted by the slow response speed of a display line. This slow response speed is caused by the relatively large capacitance and resistance of the display line.

Since the display line responds so slowly, it has appeared impossible to use one output of an off-substrate (also referred to as "off-panel" or "off-chip") driver to control large numbers of lines on the display, unless some integrated line driver circuitry is provided on the display substrate for each line of the display. However, displays using on-chip line drivers suffer from either severe process control requirements or non-uniform gray levels. Such problems arise because of the variation in the voltage required to turn on the transistor elements of the amplifiers of on-chip driver circuitry. As a result of processing variations across the several inches of distance along the edge of a display, the turn-on or "threshold" voltage of such transistors varies, resulting in non-uniform amplification and hence non-uniform gray levels, i.e. a distorted image. Only imposition of severe, impractical process control requirements can minimize the threshold voltage variation between adjacent transistor devices.

With the continuing need to reduce interconnection complexity as higher resolution, higher density liquid crystal displays evolve, it would be highly desirable to have the capability to control four or more lines of a display from a single driver output. However, because of the aforementioned problems, prior art approaches are believed to lack such capability.

SUMMARY OF THE INVENTION

It is therefore an object of the invention to improve liquid crystal displays;

It is another object of the invention to reduce interconnection complexity in liquid crystal displays;

It is another object of the invention to increase the degree to which input lines of a liquid crystal display may be multiplexed to a single off-substrate driver.

It is yet another object of the invention to provide line driver circuitry on the liquid crystal display, while avoiding severe process control requirements and non-uniform gray levels.

According to the invention, the foregoing objects and others are realized by disposing line driver amplifiers and associated compensation circuitry on the same substrate as the liquid crystal display. The compensation circuitry is designed to adjust the level of the video signal provided to each display cell to compensate for variations in the driver circuitry. In this manner the effects of offset between the inputs and outputs of the amplifiers are eliminated.

In one embodiment, the driver circuitry includes an amplifier, an input capacitor connected to an amplifier input, a plurality of switches, and a sample-hold capacitor. The switches are appropriately closed to connect the amplifier input to a null or reference voltage, resulting in storage of an offset compensation voltage on the input capacitor and to thereafter supply a sample of the display line voltage to the sample-hold capacitor. In a preferred embodiment, two amplifier stages configured as just described are cascaded to form a double buffer system.

BRIEF DESCRIPTION OF THE DRAWINGS

The just summarized invention will now be described in detail in conjunction with the drawings of which.

DETAILED DESCRIPTION OF THE PREFERRED EMBODIMENTS

Figure 1:
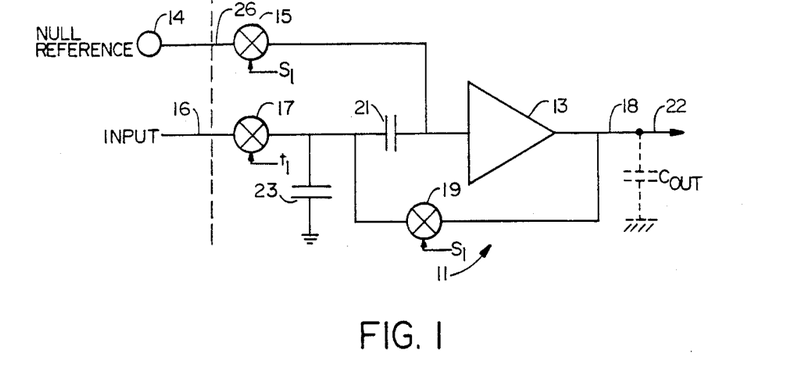
FIG. 1 is a circuit schematic diagram of a single stage compensated line driver according to the preferred embodiment.

FIG. 1 illustrates a single stage compensated line driver 11 according to the preferred embodiment. The line driver 11 is fabricated on a liquid crystal display substrate, one edge 24 of which is shown in FIG. 1. The line driver 11 includes a unity gain amplifier 13, three switches 15, 17, 19; an input capacitor 21; and a sample and hold capacitor 23. A first terminal of the input capacitor 21 is connected to the input of the amplifier 13, while the second terminal of the input capacitor 21 is connected to a first terminal of the sample and hold capacitor 23. The second terminal of the sample and hold capacitor 23 is grounded. The output 18 of the amplifier 13 is connected to a column supply bus 22 of the liquid crystal display and sees a capacitance $C_{out}$, shown in phantom, which represents the capacitance of the display line supplied by the column bus 22.

The three switches 15, 17, 19 are used to configure the circuit into one of two modes—the compensation mode or the operating mode. The first switch 15 is connected to a null reference voltage source 14 over a line 26 and, when activated by a control signal $S_1$, switches the null reference voltage to the first terminal of the input capacitor 21, and hence to the input of the amplifier 13. The third switch 19 is connected to the output of the amplifier 13 and, when activated by the control signal $S_1$, switches the amplifier output voltage to the second terminal of the input capacitor 21. The second switch 17 is connected to an input signal source over an input line 16 and, when activated by a control signal $t_1$, switches the input signal to the first terminal of the sample and hold capacitor 23. As will be later illustrated in more detail, these switches 15, 17, 19 may be transistor switches, for example of the field effect type.

Figure 2:
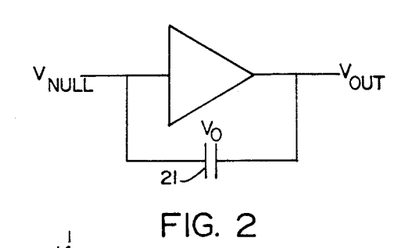
FIG. 2 is a circuit schematic diagram illustrating a first mode of operation of the circuit of FIG. 1.

In operation, the circuit of FIG. 1 is cycled between the compensation mode and operation mode as follows. During the compensation mode, the second switch 17 to the input signal is open, while the first and third switches 15, 19 are closed by application of the common control signal SI The circuit then effectively appears as shown in FIG. 2. Assuming that the amplifier 13 is linear and has unity gain, the following relation may be stated:

$$Vout = Vo + Vin \qquad (1)$$

where Vout is the output of the unity gain amplifier 13, Vo is the offset voltage of the amplifier which is developed across and stored on the capacitor 21 during the compensation mode, and Vin is the input voltage to the amplifier 13. For the particular circuit of FIG. 2, this equation gives:

$$Vout = Vo + Vnull \qquad (2)$$

Equation (1) implies that a voltage $-Vo$ becomes stored on the input capacitor 21.

Figure 3:
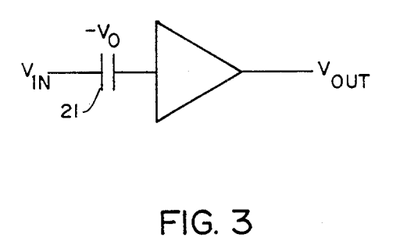
FIG. 3 is a circuit schematic diagram illustrating a second mode of operation of the circuit of FIG. 1.

During the operation mode, the second switch 17 to the input signal is closed by application of the control signal $t_1$, while the first and third switches 15, 19 are opened. This configuration is shown in FIG. 3. The configuration of FIG. 3 results in the effective input signal being the actual input from off-substrate circuitry reduced by the offset or compensation voltage Vo. When this voltage is input to the amplifier 13, the offset of the amplifier 13 is added to the input signal to give:

$$\begin{aligned} Vout &= Vo + Vin = Vo + (Vin - Vo) \\ &= Vin \end{aligned} \qquad (3)$$

As is apparent from Equation (3), the output voltage Vout has been compensated for variations in the offset voltage Vo of the amplifier 13.

Figure 4:
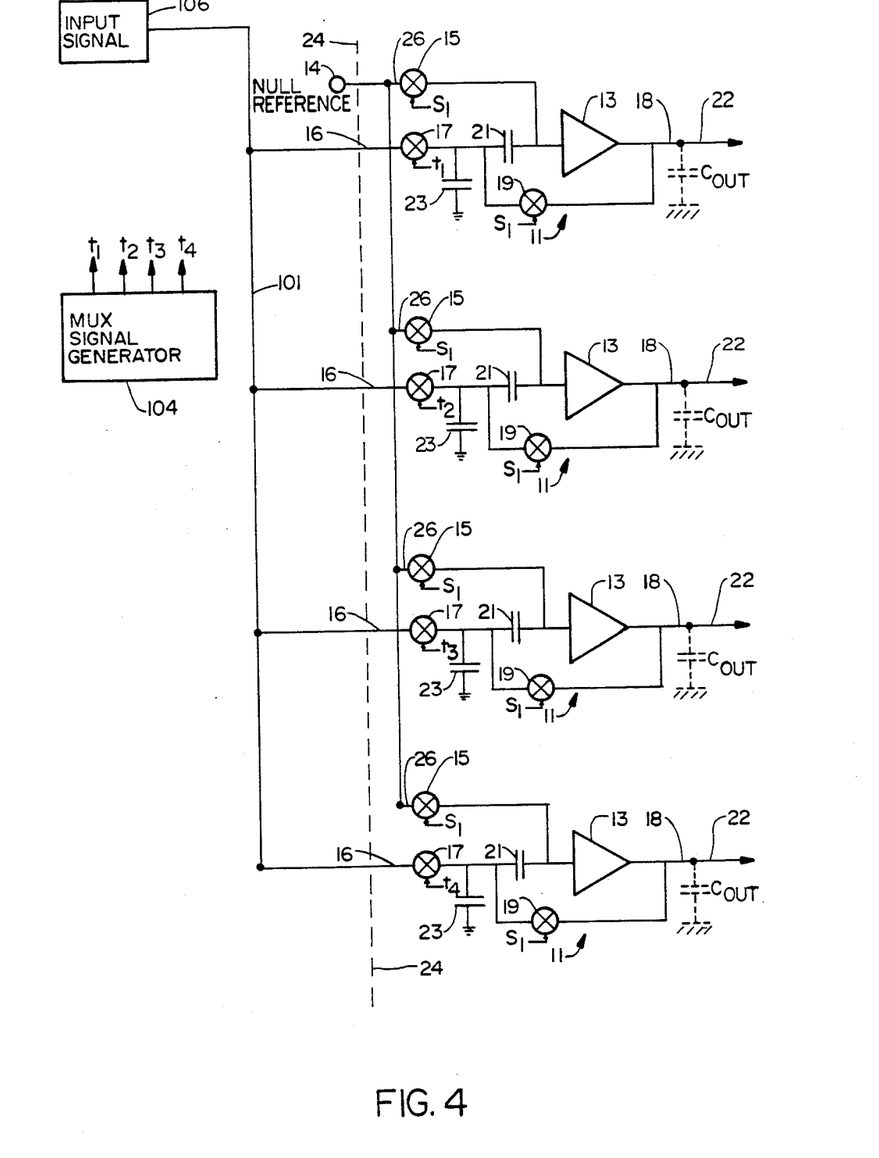
FIG. 4 is a circuit schematic diagram of a plurality of single stage compensated line drivers arranged on a display substrate according to the preferred embodiment.

In the operational configuration of FIG. 1, the second switch 17 connected to the input line 16 acts as the sample switch in a multiplexer, while the sample and hold capacitor 23 stores the sampled voltage while it is amplified and applied to the display line by the amplifier 13. A multiplexed configuration of a number of circuits according to FIG. 1 is shown in FIG. 4. According to FIG. 4, each input line 16 is connected to the output line 101 of a single off-substrate driver 106. The output line 101 thus supplies a common signal, such as a video signal, to each input line 16. Each second switch 17 receives an input of a respective one of the input lines 16 and one of a succession of switching signals $t_1$, $t_2$, $t_3$, $t_4$, from a multiplexer timing generator 104. A common null reference voltage and switching signal $S_1$ is supplied to each first switch 15, and the common switching signal $S_1$ is also supplied to each third switch 19. To achieve multiplexed operation, the timing signals $t_1$, $t_2$, $t_3$, $t_4$ cause successive samples of the video signal to be taken and held by the capacitors 23, after provision of the signal $S_1$ has caused compensation of the amplifiers 13 as described above. As a result of the small size of the integrated sample capacitor 23 relative to the capacitance $C_{out}$ of an entire line of the display, the compensated driver circuit of FIG. 1 permits larger numbers of display lines to be controlled by one off-display driver output 101 than would otherwise be permitted.

The number of connections to the off-substrate devices can be reduced by modifying the embodiment of FIG. 1 so that the input line 16 is used to supply both the input signal and the null reference voltage. In such case, the line 26 connecting the null reference voltage source 14 to the first switch 15 is connected on-chip to the input line 16, and only the single line 16 continues off-chip. The null reference and input signal would then be alternately supplied off-chip to the input line 16 and appropriately switched by the first, second, and third switches 15, 17, 19, as previously described. The embodiment presented in FIG. 1 is more flexible, however, since the stability requirements for the reference line do not have to be impressed on the input line 16. It may be noted that the value of the null reference voltage on the null reference line 26 is chosen to optimize the operating point of the amplifier 13 during nulling. It may be further observed that the embodiment of FIG. 1 does not compensate for variations in gain or for variations in non-linearity of the circuit. In practice, such variations are much smaller than the variations due to offset.

Figure 5:
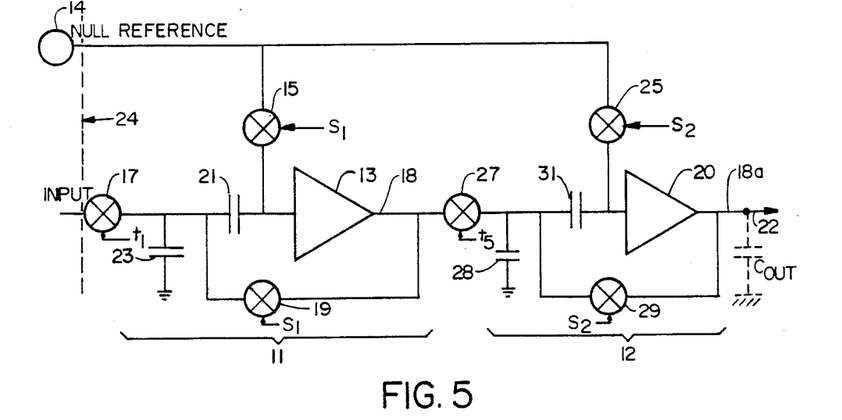
FIG. 5 is a circuit schematic of a two stage or "double buffer" compensated line driver according to the preferred embodiment.

Use of the single buffered circuit of FIG. 1 in a multiplexed configuration as in FIG. 4 has the drawback that the drive signal provided to the column supply bus 22 of the display is available for differing amounts of time, depending on when a particular compensated line driver 11 is loaded by the multiplexer 104. The serial loading of the respective buffers 11 can result in non-uniformity in the voltage applied to respective display lines if sufficient time is not available for all of the line driver outputs 18 to stabilize before they are stored in the active display cell matrix. To avoid this problem, two of the circuits 11 shown in FIG. 1 may be connected in series, as shown in FIG. 5. The double buffering of the input video signal accomplished by the embodiment of FIG. 5 not only allows all of the lines 22 of the display to be driven for the same amount of time, but also allows more time for them to settle prior to storage of the applied voltages in the display cells.

According to FIG. 5, the second stage or buffer 12 includes three switches 25, 27, 29, a second sample-hold capacitor 28, a second input capacitor 31 and a second amplifier 20. The connections of these elements are identical to corresponding elements of FIG. 1 with the second switches 15, 25 being connected to the same null reference voltage provided by the voltage source 14 and being switched by respective switching signals $S_1$, $S_2$. It may be noted that the null reference voltages for the two stages do not have to be the same.

The double buffered system of FIG. 5 operates as follows. During the horizontal retrace portion of the video signal, the amplifier 20 of the second buffer 12 is compensated through use of the compensation cycle as described above, i.e. through concurrent closure of the first and third switches 25, 29 of the second buffer 12. The second buffer 12 is then loaded with the video sample stored on the sample hold capacitor 23 of the first buffer 11 by activation of the switch 27. Activation of the switch 27 transfers the amplified video sample at the output 18 of the first amplifier 13 of the first buffer 11 to the second sample hold capacitor 28 of the second buffer 12. After the video sample is stored on the second sample-hold capacitor 28, the first buffer 11 is reset by activation of the signal $S_1$ to close the first and third switches 15, 19. While the next line of video information is being sampled and stored in the first buffer 11, the second buffer 12 is driving the display line connected to the output 18a of the second amplifier 20.

In a multiplexed system employing double buffer circuits as shown in FIG. 5, the first buffers 11 are connected and operated as shown in FIG. 4. In such a multiplexed system, each of the switches 27 of the second buffer circuits 12 is simultaneously closed by a common switch signal $t_5$. Hence, the video signal originally stored serially in each of the first buffers 11 is stored in a respective capacitor 28 and applied to the display in parallel, at the same time.

Figure 6A:
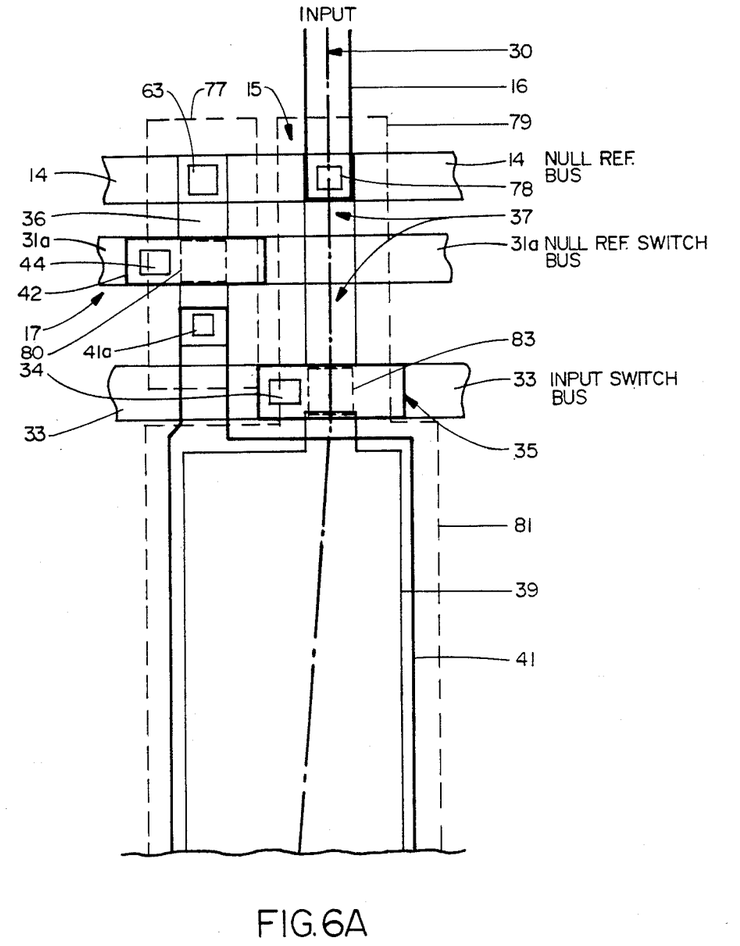
FIGS. 6A and 6B comprise a top schematic view of an integrated circuit embodiment of a single stage compensated line driver.
Figure 6B:
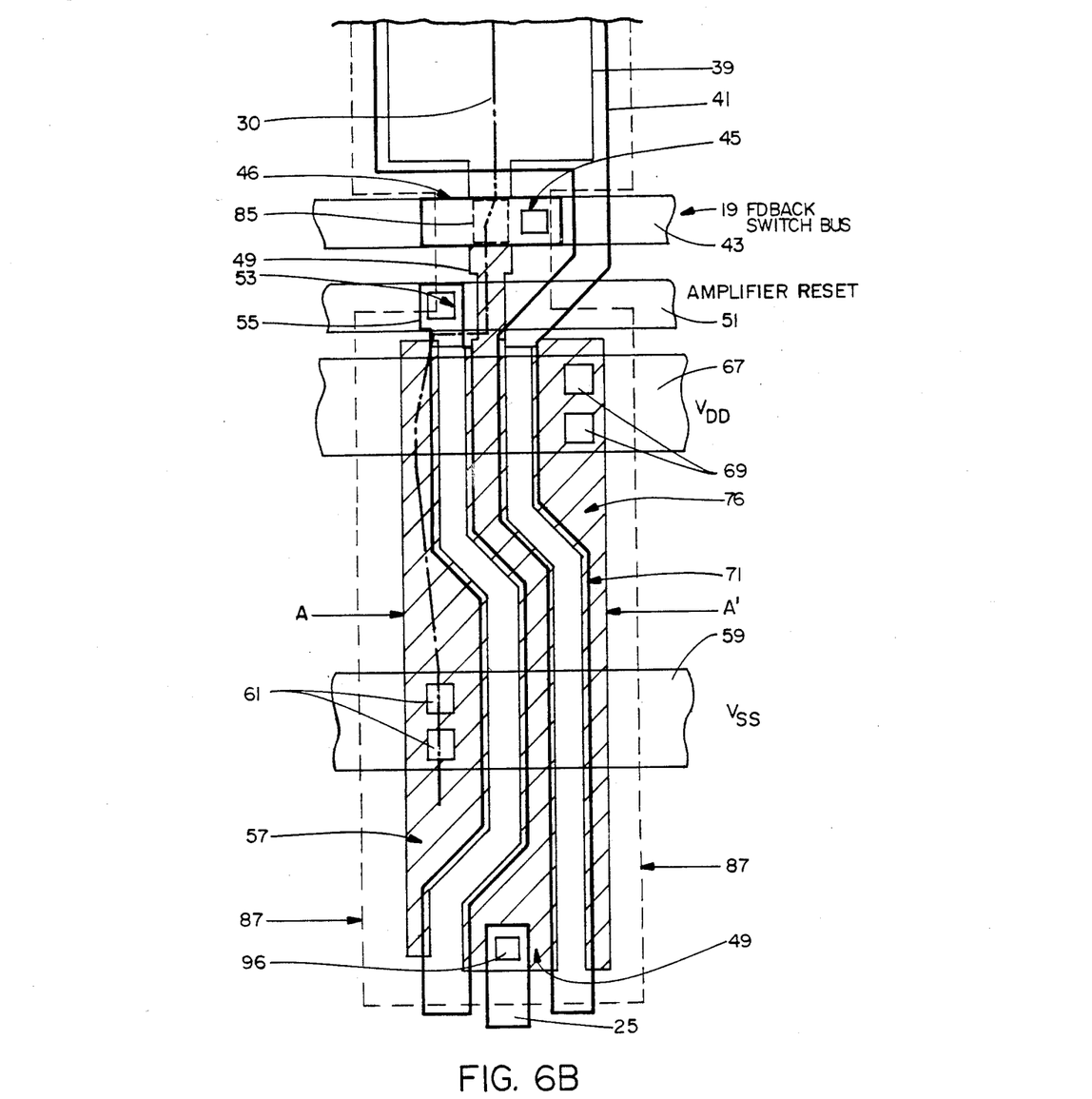
Figure 6C:
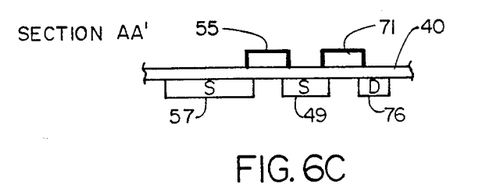
FIG. 6C is a sectional schematic view taken at AA' of FIG. 6B.

FIGS. 6A-6C illustrate an integrated circuit layout for the single buffer circuit of FIG. 1. The layout of a two stage circuit such as that disclosed in FIG. 5 simply connects the output 25 of the single buffer circuit shown in FIG. 6B to the input of a circuit which is a replication of that of FIGS. 6A-6C. In FIGS. 6A and 6B polysilicon regions are outlined by the thicker black lines for clarification, while channel stop is indicated by dashed lines 77, 79, 81.

Figure 7:
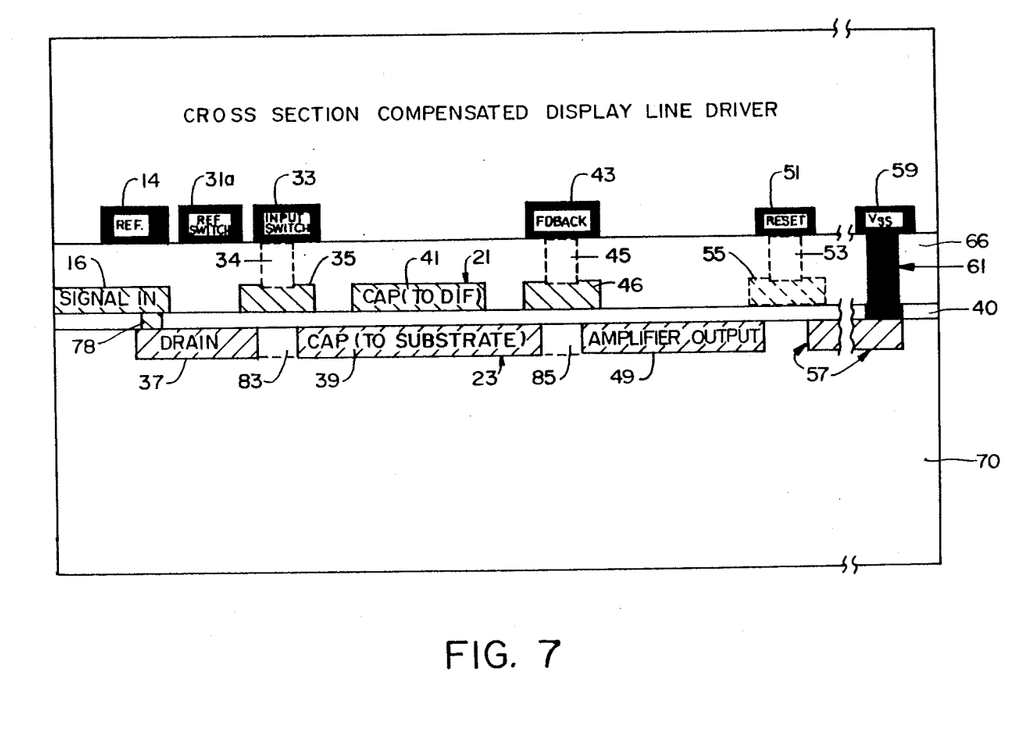
FIG. 7 is a cross-sectional schematic diagram taken along line 30 of FIGS. 6A and 6B illustrating the cross-sectional structure of the preferred embodiment.

FIG. 7 illustrates a section of the integrated circuit structure of FIGS. 6A-6B taken along an alternating long and short dashed line 30 shown in FIGS. 6A and 6B. This sectional drawing provides additional clarification and further illustrates the layer structure of the device. In FIG. 7, dashed lines indicate structural elements, e.g. 34, 45, 53, which are either in front of or behind the section 30. Reference to FIGS. 6A-6C and 7 is suggested for a more ready appreciation of the structure and operation of the integrated circuit embodiment.

The input signal path structure and the structure for controlling the application of the null reference voltage are formed at the top of the circuit of FIG. 6A, and illustrated at the left of the cross-section of FIG. 7. The input signal path structure realizes the function of the input switch 17 of FIG. 1, while the structure for controlling application of the null reference voltage realizes the function of the null reference switch 15 of FIG. 1.

The input signal path lies generally within the rectangular area circumscribed by channel stop 79. The input signal is applied to a polysilicon input signal line 16. The polysilicon input signal line 16 passes underneath the null reference bus 14 and is connected by a buried polysilicon contact 78 to a structure including a drain diffusion 37, a source diffusion 39 and a polysilicon gate 35 disposed over a thin gate oxide 83. An input switch bus 33 passes over the polysilicon gate 35 and is connected to the polysilicon gate 35 by a metal contact 34. The drain diffusion 37 is disposed to pass the input signal to the source diffusion 39 when the polysilicon gate 35 receives an appropriate gate signal on the input switch bus 33. The source diffusion 39 in turn provides the function of the capacitor 23 of FIG. 1.

The structure for controlling application of the null reference voltage is located within the channel stop indicated by the dashed line 77 in FIG. 6A and includes a second drain diffusion 36 and a polysilicon gate 42 overlying a thin gate oxide 80. A null reference switch bus 31a is employed to supply the gate signal to the polysilicon gate 42 via a metal contact 44 to selectively cause connection of the null reference voltage to the polysilicon capacitor plate 41. In FIG. 6A, the null reference bus 14 is connected via a metal contact 63 to a second drain diffusion 36. The drain diffusion runs parallel to the drain diffusion 37 of the input signal structure, and hence is not shown in FIG. 7. The second drain diffusion 36 is disposed to pass the null reference voltage on the bus 14 to a polysilicon capacitor "plate" 41 via a polysilicon contact 41a when the associated polysilicon gate 42 receives an appropriate gate signal on bus 31a. The capacitor plate 41 provides the function of the capacitor 21 of FIG. 1.

It will be appreciated that the source diffusion 39 and the polysilicon region 41 comprise a pair of storage capacitors located one over the other. As better seen in FIG. 7, the sample capacitor 23 comprises the capacitance of the diffused junction between the source diffusion 39 and the substrate 70. The nulling capacitor 21 comprises the capacitance between the diffused junction and a polysilicon plate 41.

In order to further realize the structure of FIG. 1, the polysilicon capacitor 41 is extended to form the elongated gate 71 of a large field effect transistor structure shown in FIG. 6B. The field effect transistor structure realizes the function of the amplifier 13 of FIG. 1. In FIG. 6B, source and drain diffusion areas of the field effect transistor are indicated by crosshatching.

The field effect transistor of FIG. 6B includes the gate 71, a drain diffusion 76 and a source diffusion 49. A section AA' across the transistor structure is illustrated in FIG. 6C for further illustration. As may be seen, the polysilicon gates 55, 71 are disposed on the oxide layer 40 and slightly overlap each edge of the diffused regions 76, 49, 57. Hence, the crosshatching in FIG. 6B extends within the polysilicon boundaries represented by the thicker solid lines.

Drain and source voltages $V_{DD}$, $V_{SS}$ are applied to the field effect transistor structure by respective buses 59, 67 which contact respective diffusions 57, 76, through metal contacts 61, 69. A polysilicon element 25 provides the output of the amplifier 13 through a contact 96. Channel stop 87 is also indicated by dashed lines in FIG. 6B.

The feedback switch 19 of FIG. 1 is integrated above the transistor structure and below the capacitor areas 39, 41. The feedback switch 19 includes a polysilicon gate 46 located between the amplifier source diffusion 49 and the capacitor diffusion 39. The polysilicon gate 46 is disposed over a thin gate oxide region 85. A feedback switch bus 43 is connected to the polysilicon gate 46 by a metal contact 45 to activate the feedback switch 19.

The field effect transistor structure is reset by a reset signal applied to a reset switch including an elongated polysilicon gate 55. A reset switch bus 51 overlies the polysilicon gate 55 and applies an activation (reset) signal to the gate 55 through a metal contact 53. The reset function is accomplished by conduction between the drain diffusion 57 and the source diffusion 49 enabled by application of an appropriate signal to the gate 55.

The reset function just described is necessitated by the field effect structure employed. When a signal appears on the polysilicon gate 71, the voltage on the source diffusion 49 is pulled towards supply voltage $V_{DD}$ proportionally to the strength of the voltage on gate 71. After this output is provided to cooperating circuitry via output 25, it is necessary to pull the amplifier in the other direction, which is accomplished by turning gate 55 on hard, thereby pulling diffusion 49 back down to $V_{SS}$. The reset function may be considered to occur within the amplifier 13 in the schematic of FIG. 1.

It will be appreciated by those skilled in the art that the structure disclosed in FIGS. 6A–6C and 7 may be fabricated according to conventional, well-known MOS fabrication techniques.

Figure 8:
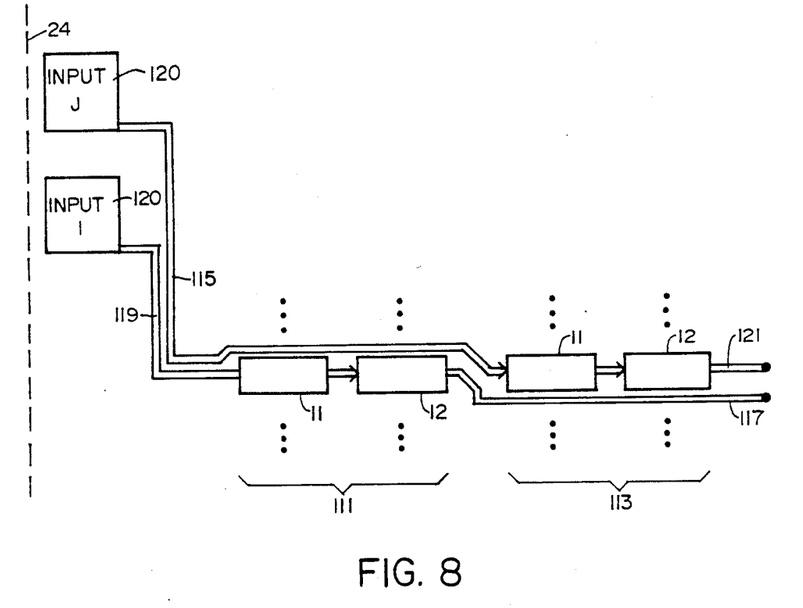
FIG. 8 is a schematic layout showing advantageous positioning of double buffer circuits in an integrated circuit embodiment.

The layout of FIGS. 6A–C and 7 may be constructed in an area approximately 100 microns wide and 700 microns long. By running another input down one edge of the structure and the output of the amplifier 13 down the opposite edge, one can drive lines on 50 micron centers (500 per inch density). Such a structure is illustrated in FIG. 8 where each block 11, 12 represents a circuit like that of FIG. 6A and 6B. As may be seen, one double buffer driver 111 is laid out in line with a second double buffer driver 113. Each double buffer circuit receives its input from a respective input line 115, 119, each of which emanates from a respective on-chip contact pad 120. Each double buffer circuit 111, 113 also has a respective output line 117, 121. The input line 115 for the second double buffer driver 113 runs down one edge of the first double buffer driver 111, while the output 117 of the first double buffer driver 111 runs down the opposite edge of the second double buffer driver 113. It may be noted that in such an embodiment, the output transistors of the first stage 11 of each of the double buffer circuits 111, 113 can be smaller than the output transistors of the second stage 12, which must drive the capacitance of a display line, e.g. $C_{out}$, FIG. 1.

The just described embodiments provide an improved liquid crystal display wherein several input lines to the display may be multiplexed with a single off-substrate driver circuit, while avoiding the complications of amplifier offset. Accordingly, the just described embodiment contributes to improved resolution and reduced display complexity.

Those skilled in the art will further appreciate that numerous adaptations and modifications of the just described preferred embodiments may be made without departing from the scope and spirit of the invention. Therefore, it is to be understood that, within the scope of the following claims, the invention may be practiced other than as specifically described herein.

What is claimed is:

1. In a driver circuit fabricated on a substrate for supplying a display signal to a liquid crystal display line, the circuitry comprising:
   an amplifier means on said substrate having an input and an output;
   compensation means on said substrate for compensating for offset in the output voltage of said amplifier means; said compensation means comprising:
   first charge storage means having an input and having an output connected to the input of said amplifier means;
   first switch means responsive to a first control signal for connecting said output of said amplifier means to said input of said first charge storage means;
   second switch means responsive to said first control signal for connecting a reference voltage to said output of said first charge storage means;
   second charge storage means for storing said sample, said second charge storage means being connected to the input of said first charge storage means; and
   third switch means responsive to a second control signal for switching said display signal to said second charge storage means.

2. The driver circuitry of claim 2 wherein said first, second and third switch means are fabricated in an integrated circuit structure as gate controlled field effect devices.

3. The driver circuitry of claim 2 wherein said first and second charge storage means are formed in said integrated structure and comprise:
   a diffusion layer fabricated in a substrate;
   an insulating layer formed over said diffusion layer; and
   a polysilicon layer formed over said insulating layer.

4. The driver circuitry of claim 3 wherein said amplifier means is fabricated in said integrated circuit structure and comprises:
   first, second and third diffusion regions, separated by first and second channels respectively;
   an oxide layer overlying said diffusion regions; and
   gate structure means disposed on said oxide layer for selectively applying a control signal to said first and second channels.

5. Driver circuitry fabricated on a common substrate for supplying drive signals to a plurality of liquid crystal display lines comprising:
   means for supplying an input signal on a common input;
   null reference voltage source means for providing a null reference voltage;
   a plurality of first amplifier means on said substrate each having an input and an output; and
   a plurality of first circuit means on said substrate each receiving said input signal as a first input and said null reference voltage as a second input, each of said plurality of first circuit means being associated with a corresponding one of said first amplifier means for selectively supplying said input signal to the corresponding said first amplifier means and for compensating for offset in the output voltage of the corresponding said first amplifier means.

6. The driver circuitry of claim 5 wherein each said first circuit means is responsive to a first common control signal to compensate the corresponding first amplifier means for said offset.

7. The driver circuitry of claim 6 wherein said plurality of first circuit means are responsive to successive control signals to gate and hold a respective sample of said common input signal for supply to the corresponding first amplifier means.

8. The driver circuitry of claim 7 wherein each said first circuit means comprises:
   first charge storage means having an input and having an output connected to the input of said first amplifier means;
   first switch means responsive to a first control signal for connecting said output of said first amplifier means to said output of said first charge storage means;
   second switch means responsive to said first control signal for connecting said null reference voltage to said input of said first charge storage means;
   second charge storage means for storing said respective sample, said second charge storage means being connected to the input of said first charge storage means; and
   third switch means responsive to one of said successive control signals for switching said common input signal to said second charge storage means.

9. The driver circuitry of claim 8 wherein said first, second and third switch means are fabricated in an integrated circuit structure as gate controlled field effect devices.

10. The driver circuitry of claim 9 wherein said first and second charge storage means are formed in said integrated structure and comprise:
    a diffusion layer fabricated in a substrate;
    an insulating layer over said diffusion layer; and
    a polysilicon layer formed over said insulating layer.

11. The driver circuitry of claim 10 wherein said amplifier means is fabricated in said integrated circuit structure and comprises:
    first, second and third diffusion regions, separated by first and second channels respectively;
    an oxide layer overlying said diffusion regions; and
    first and second gate structure means, the first gate structure means disposed on said oxide layer for respectively applying a control signal to said first and second channels.

12. The driver circuitry of claim 5 further including:
    a plurality of second amplifier means on said substrate, one associated with each of said first amplifier means; and
    a plurality of second circuit means on said substrate, each receiving a respective output of one of said first amplifier means for sampling and storing said respective output and for compensating for offset in the output of said second amplifier means.

13. The driver circuitry of claim 12 wherein each said second circuit means is responsive to a second common control signal to compensate its corresponding second amplifier means for said offset.

14. The driver circuitry of claim 13 wherein each said second circuit means is responsive to a third common control signal to sample and store the respective outputs of each said first amplifier means.

15. The driver circuitry of claim 13 wherein each said second circuit means comprises:
    first charge storage means having an input and having an output connected to the input of a respective one of said second amplifier means;
    first switch means responsive to said second common control signal for connecting the output of said respective one of said second amplifier means to said input of said first charge storage means;
    second switch means responsive to said second common control signal for connecting a reference voltage to said output of said first charge storage means;
    second charge storage means for storing a sample of the output of a respective one of said first amplifier means, said second charge storage means being connected to the input of said first charge storage means; and
    third switch means responsive to said third common control signal for switching the output of said respective one of said first amplifier means to said second charge storage means.

16. In a driver circuit fabricated on a substrate for supplying a display signal to a liquid crystal display line, the circuitry comprising:
    an amplifier means on said substrate having an input and an output;
    compensation means on said substrate for compensating for offset in the output voltage of said amplifier means;
    a second amplifier means having an input and an output; and
    means on said substrate for sampling and holding the output of said first amplifier means, for supplying the held output of said first amplifier means to the input of said second amplifier means and for compensating for offset in the output of said second amplifier means.

17. The driver circuit of claim 16 wherein said means for compensating for offset in the output of said second amplifier means comprises:
    first charge storage means having an input and having an output connected to the input of said second amplifier means;
    first switch means responsive to a first control signal for connecting said output of said second amplifier means to said input of said first charge storage means;
    second switch means responsive to said first control signal for connecting a reference voltage to said input of said first charge storage means;
    second charge storage means for storing said sample, said second charge storage means being connected to the input of said first charge storage means; and
    third switch means responsive to a second control signal for switching the output of said first amplifier means to said second charge storage means.

* * * * *